United States Patent
Schweizer

(10) Patent No.: US 8,567,181 B2
(45) Date of Patent: Oct. 29, 2013

(54) PROCEDURE FOR METERING A REAGENT AND DEVICE FOR IMPLEMENTING THE PROCEDURE

(75) Inventor: Frank Schweizer, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 678 days.

(21) Appl. No.: 12/432,375

(22) Filed: Apr. 29, 2009

(65) Prior Publication Data
US 2010/0005781 A1    Jan. 14, 2010

(30) Foreign Application Priority Data

Jul. 11, 2008   (DE) .................. 10 2008 040 377

(51) Int. Cl.
*F01N 3/00*   (2006.01)
(52) U.S. Cl.
USPC .................................. 60/295; 60/301; 60/277
(58) Field of Classification Search
USPC ........................................... 60/286, 295, 301
See application file for complete search history.

(56) References Cited

U.S. PATENT DOCUMENTS

| | | | |
|---|---|---|---|
| 2003/0037540 A1* | 2/2003 | Hahn et al. ..................... | 60/285 |
| 2003/0192305 A1* | 10/2003 | Iihoshi et al. .................. | 60/277 |
| 2005/0022508 A1* | 2/2005 | Rosel et al. ..................... | 60/277 |
| 2005/0103000 A1* | 5/2005 | Nieuwstadt et al. ............ | 60/286 |
| 2006/0096278 A1* | 5/2006 | Lueders et al. ................. | 60/286 |
| 2007/0056267 A1* | 3/2007 | Handler et al. ................. | 60/286 |
| 2008/0022658 A1* | 1/2008 | Viola et al. ..................... | 60/286 |
| 2008/0216463 A1* | 9/2008 | Chaineux et al. .............. | 60/274 |
| 2010/0028230 A1* | 2/2010 | Gady et al. .................. | 423/239.1 |
| 2010/0326051 A1* | 12/2010 | Busch et al. ................... | 60/274 |

FOREIGN PATENT DOCUMENTS

| | | | |
|---|---|---|---|
| DE | 199 03 439 | | 8/2000 |
| DE | 10 2004 031 624 | | 2/2006 |
| DE | 102005012568 | * | 9/2006 |
| DE | 10 2005 042 487 | | 3/2007 |
| DE | 10 2005 042 488 | | 3/2007 |
| DE | 10 2005 042 489 | | 3/2007 |
| DE | 10 2005 042 490 | | 3/2007 |
| DE | 102006041676 | * | 3/2008 |

* cited by examiner

*Primary Examiner* — Thomas Denion
*Assistant Examiner* — Patrick Maines
(74) *Attorney, Agent, or Firm* — Merchant & Gould P.C.

(57) ABSTRACT

A procedure for metering a reagent into an exhaust duct of a combustion engine, which is required for a catalytic conversion of NOx in a SCR-catalyzer and a device for implementing the procedure are suggested. Determined is the difference between a calculated and a measured NOx-concentration each downstream after the SCR-catalyzer. The difference is compared to a difference threshold. After an exceeding of the difference threshold a lowering of the metering rate on to a sinking metering rate is undertaken, which is higher than zero. After a waiting time, a comparison of the calculated and the measured NOx-concentration is provided each downstream after the SCR-catalyzer. If the measured NOx-concentration is above the calculated NOx-concentration the metering rate is increased. If the measured NOx-concentration is below the calculated NOx-concentration the metering rate is lowered. The approach according to the invention enables an adaptation of the metering, at which it is ensured that a NOx-conversion can always take place.

10 Claims, 3 Drawing Sheets

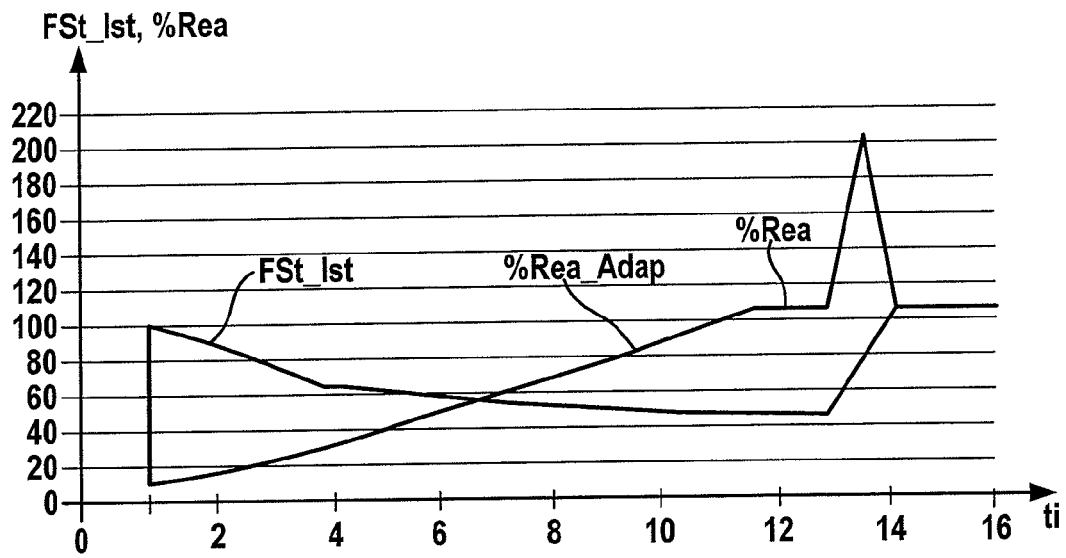
Fig. 4
Fig. 5
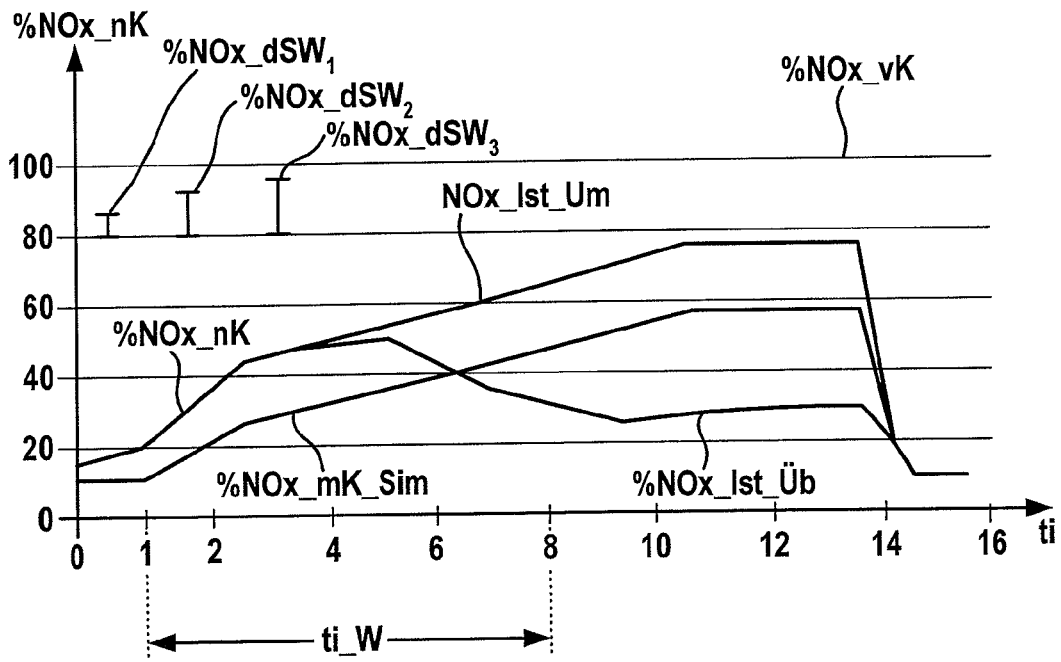

US 8,567,181 B2

PROCEDURE FOR METERING A REAGENT AND DEVICE FOR IMPLEMENTING THE PROCEDURE

TECHNICAL FIELD

The invention is based on a procedure for metering a reagent or a precursor of a reagent into the exhaust duct of a combustion engine and on a device for implementing the procedure.

Subject matter of the present invention are also a computer program and a computer program product.

BACKGROUND

DE 199 03 439 A1 describes a procedure for operating a combustion engine, in whose exhaust duct a SCR-catalyzer (selective catalytic converter) is arranged, which reduces the nitrous gases that are in the exhaust gas of the combustion engine with a reagent to nitrogen. The metering of the reagent or the precursor of a reagent preferably takes place depending on operating parameters of the combustion engine, such as the engine speed and the injected fuel amount. Furthermore the metering preferably takes place depending on at least one exhaust gas parameter, as for example the exhaust gas temperature or the temperature of the SCR-catalyzer. The reducing agent ammoniac is used as the reagent, which is won from a reagent precursor, in particular a urea-water solution.

The metering of the reagent or the precursor of the reagent into the exhaust duct has to be determined carefully. A too low metering causes that nitrous gases cannot be completely reduced in the SCR-catalyzer anymore. A too high metering causes a reagent slip, which can cause an unnecessarily high reagent consumption on the one hand and depending on the quality of the reagent an undesired odor nuisance on the other hand.

DE 10 2004 031 624 A1 describes a procedure for metering a reagent into the exhaust duct of a combustion engine, at which a control or regulation of the reagent filling level in the SCR-catalyzer is provided on to a default reagent filling level. The aimed default of the reagent filling level ensures on the one hand that a sufficient amount of reagent is available in unsteady states of the combustion engine for a NOx-reduction as completed as possible and that one the other hand a reagent slip downstream after the SCR-catalyzer is avoided.

DE 10 2005 042 487 A1 describes a procedure for metering a reagent or a precursor of a reagent into an exhaust duct of a combustion engine, which also contains a SCR-catalyzer. The reagent filling level in the SCR-catalyzer is here also controlled or regulated on to a default reagent filling level, but determined on to a maximum value, which corresponds with a SCR-catalyzer that is completely filled with reagent. If sensor signal changes occur a too high metering can always be assumed. The SCR-catalyzer is always operated with the maximally possible efficiency, at which the maximally possible NOx-conversion occurs.

DE 10 2005 042 489 A1 describes a procedure for operating a combustion engine, in whose exhaust duct at least one SCR-catalyzer is arranged, which is impinged with a reagent, which contributes to the NOx-conversion. An amount for the NOx-concentration that appears downstream after the SCR-catalyzer is calculated and also measured with a NOx-sensor, which provides a lateral sensitivity towards the reagent. A difference between the calculated amount and the measured amount of the NOx-concentration downstream after the SCR-catalyzer is determined, which is considered at the determination of the metering rate of the reagent or the precursor of the reagent. Provided is a reasonability check, at which the amount of reagent or precursor of a reagent that is metered in a length of time and the reagent amount that is converted in the SCR-catalyzer and/or the converted NOx-amounts are compared to each other. In the case of a deviation a correcting signal is provided, which adapts the metering signal.

An improvement of the way of proceeding that is described in DE 10 2005 042 489 A1 is stated in DE 10 2005 042 490 A1, which provides that the differences are determined in a timely order and saved. The metering rate is determined depending on a default amount and/or default order of evaluation results of the differences. Thereby a long-term adaptation of the metering rate is achieved.

DE 10 2005 042 488 A1 described a procedure for operating a combustion engine, in whose exhaust duct a SCR-catalyzer is also arranged, which is impinged with a reagent or a precursor of a reagent, which contribute(s) to the NOx-conversion in the SCR-catalyzer. Calculated is an amount for the NOx-concentration that occurs downstream after the SCR-catalyzer. A NOx-sensor, which is arranged downstream after the SCR-catalyzer, provides a sensor signal, which corresponds at least with the NOx-concentration and due to the lateral sensitivity of the NOx-sensor with a reagent slip. A reagent signal, which determines the metering rate of the reagent, is influenced by a correcting signal depending on the difference between the measured and the calculated NOx-concentration each downstream after the SCR-catalyzer and depending on a measure for the temperature of the SCR-catalyzer.

The invention is based on the task to provide a procedure for metering a reagent into the exhaust duct of a combustion engine and a device for implementing the procedure, which allow an adaptation of the metering rate, whereby a continuous NOx-conversion is ensured.

This task is solved by the characteristics that are stated in the independent claims.

SUMMARY

The way of proceeding according to the invention for metering a reagent or a precursor of a reagent into the exhaust duct of a combustion engine, which is required for a catalytic conversion of NOx in a SCR-catalyzer, is based on the fact that the difference between a calculated and a measured NOx-concentration each downstream after the SCR-catalyzer is determined and that the difference is compared to a difference threshold value. If exceeding the difference threshold value a lowering of the metering rate onto a sinking metering rate is provided, which is higher than zero. The way of proceeding according to the invention distinguishes itself thereby that after a waiting time a comparison of the calculated and the measured NOx-concentration each downstream after the SCR-catalyzer is provided and that, if the measured NOx-concentration exceeds the calculated NOx-concentration, the metering rate is increased and that, if the measured NOx-concentration falls below the calculated NOx-concentration, the metering rate is lowered.

The way of proceeding according to the invention enables the adaptation of the metering rate of the reagent or the precursor of the reagent, in order to avoid a under-metering or over-metering.

The way of proceeding according to the invention can also be implemented in the range of a diagnosis. Further the way of proceeding according to the invention can also be provided only within the range of a reasonability check.

In particular the way of proceeding according to the invention enables a high NOx-conversion even at an under-metered system during the implementation of the procedure. The high NOx-conversion is thereby achieved, that the lowering of the reagent filling level in the SCR-catalyzer to improper low values is avoided, at which a NOx-conversion cannot take place anymore.

The result that is achieved by the way of proceeding according to the invention is very secure and robust.

Even at a high deviation from the required metering rate in a controlled operation a quick adaptation towards the optimal metering rate is possible.

The application of the way of proceeding according to the invention is especially simple because the application can be carried out step by step. A iterative application is not necessary. Thereby the way of proceeding according to the invention is particularly simple and clear.

Advantageous improvements and embodiments of the way of proceeding according to the invention accrue from dependant claims.

One embodiment provides that at the comparison of the calculated and the measured NOx-concentration a difference increasing threshold value is provided and that the metering rate is increased, if the difference between the measured and the calculated NOx-concentration exceeds the difference increasing threshold value.

Equally it can be provided that at the comparison of the calculated and the measured NOx-concentration a difference lowering threshold value is provided and that the metering rate is lowered, if the difference between the measured and the calculated NOx-concentration exceeds the difference lowering threshold value.

In both cases the algebraic sign has to be considered at the difference creation. The difference increasing threshold value can be identical according to amount with the difference lowering threshold value. But the amounts can also deviate from each other.

One embodiment provides that the difference threshold value and/or the difference increasing threshold value and/or the difference lowering threshold value are determined depending on the temperature of the SCR-catalyzer.

Accordingly it can be advantageously provided that the difference threshold value and/or the difference increasing threshold value and/or the difference lowering threshold value are determined depending on the ageing or entire operating time of the SCR-catalyzer.

With these measures an adjustment of the adaptation to actual operating conditions of the SCR-catalyzer or to the progressive sinking of the conversion ability of the SCR-catalyzer with increasing operating time can be adjusted.

One embodiment provides that the procedure is only implemented if the NOx-concentration downstream after the SCR-catalyzer is at least approximately constant. Thereby it is preferably checked whether the NOx-concentration downstream after the SCR-catalyzer lies within a tolerance band. But the procedure can also be implemented at a dynamic NOx-concentration upstream before the SCR-catalyzer, if the possibility is provided to be able to reject the result of the procedure. With at least one of these measures constant starting conditions are ensured for the adaptation.

One embodiment provides that at least one comparison, but preferably all comparisons of the calculated and the measured NOx-concentration are based on average values of the calculated and/or measured NOx-concentration. Thereby the adaptation becomes independent of short-term signal deviations of the calculated and/or measured NOx-concentration.

The device according to the invention for implementing the procedure concerns first a particularly customized control unit, which contains measures for implementing the procedure, whereby a metering rate determination, a NOx-concentration calculation and an adaptation control are provided as measures.

The control unit contains preferably at least one electrical storage, in which the steps of the procedure are stored as control unit program.

The computer program according to the invention provides that all steps of the procedure according to the invention are carried out, if it runs on a computer, which is contained in a control unit.

The computer program product according to the invention with a program code that is stored on a machine-readable device carries out the procedure according to the invention, if the program runs on a computer, which is contains in a control unit.

Embodiments of the invention are illustrated in the drawing and further explained in the subsequent description.

BRIEF DESCRIPTION OF THE DRAWINGS

FIG. 4 shows a reagent filling level in a SCR-catalyzer and a metering rate of a reagent each depending on the time, and FIG. 5 shows the NOx-concentration upstream before a SCR-catalyzer as well as the calculated and measured NOx-concentration downstream after the SCR-catalyzer.

DETAILED DESCRIPTION

Figure 1:
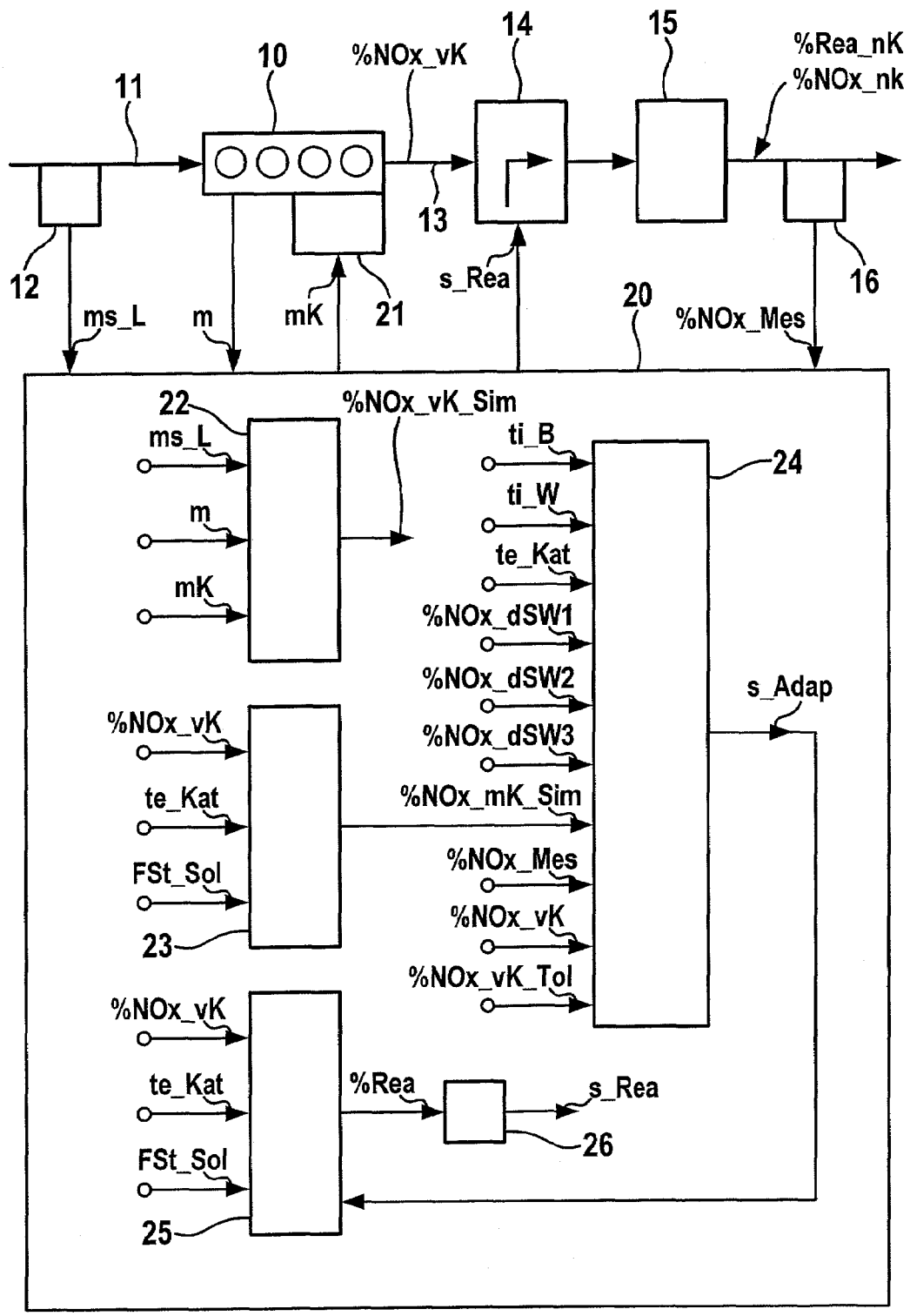
FIG. 1 shows a technical environment, in which a procedure according to the invention is carried out.

FIG. 1 shows a combustion engine 10, in whose intake air conduit 11 an intake air sensor 12 and in whose exhaust duct 13 a reagent metering device 14, a SCR-catalyzer 15 as well as a NOx-sensor 16 are arranged.

Upstream before the SCR-catalyzer 15 a NOx-concentration % NOx_vK occurs and downstream after the SCR-catalyzer 15 a NOx-concentration % NOx_nK as well as a reagent slip % Rea_nK occur.

The intake air sensor 12 provides the control unit 20 with an intake air signal ms_L, the combustion engine 10 an engine speed n and the NOx-sensor 16 a measured amount % NOx_Mes for the NOx-concentration % NOx_nK downstream after the SCR-catalyzer 15. The control unit 20 provides a fuel metering device 21 with a fuel signal mK and the reagent metering device 14 with a reagent metering signal s_Rea.

The control unit 20 contains a first NOx-concentration calculation 22 for calculating the NOx-concentration upstream before the SCR-catalyzer 15, which is provided with the intake air signal ms_L, the engine speed n and the fuel signal mK and which provides a calculated NOx-concentration % NOx_vK_Sim before the SCR-catalyzer 15.

The control unit 20 furthermore contains a second NOx-concentration calculation 23, which is provided with the NOx-concentration % NOx_vK upstream before the SCR-catalyzer 15, the temperature te_Kat of the SCR-catalyzer 15 and a reagent filling level nominal value FSt_Sol and which provides an adaptation control 24 with a calculated NOx-concentration % NOx_nK_Sim as an amount for the NOx-concentration % NOx_nK that s occurring downstream after the SCR-catalyzer 15.

The adaptation control 24 is provided furthermore with the measured NOx-concentration % NOx_nK, the NOx-concentration % NOx_vK upstream before the SCR-catalyzer 15, a tolerance band % NOx_vK_Tol, a difference threshold value % NOx_dSW1, a difference increasing threshold value % NOx_dSW2, a difference lowering threshold value % NOx_dSW3, the temperature te_Kat of the SCR-catalyzer 15, an operating time ti_B of the SCR-catalyzer 15 and a waiting time ti_W.

The adaptation control 24 sends a switching signal s_Adap to a metering rate determination 25, which is furthermore provided with the NOx-concentration % NOx-vK upstream before the SCR-catalyzer 15, the temperature te_Kat of the SCR-catalyzer 15 as well as the reagent filling level nominal value FSt_Sol and which determines a metering rate % Rea, which is provided to a metering rate signal determination 26, which provides the reagent metering signal s_Rea.

The arrangement works as follows:

A NOx-concentration % NOx_vK can occur upstream before the SCR-catalyzer 15 in the exhaust duct 13, which has to be converted in the SCR-catalyzer 15. The SCR-catalyzer 15 requires a reagent for the NOx-conversion. Ammoniac is for example provided as a reagent, which works as a reducing agent. The reagent can be directly metered into the exhaust duct 13. Alternatively it can be provided to meter a precursor of a reagent into the exhaust duct 13, whereby an urea-water solution comes into question as a precursor of the reagent for the reagent ammoniac.

The reagent or the precursor of the reagent are introduced into the exhaust duct 13 with the reagent metering device 14. The metering rate % Rea of the reagent is determined by the metering rate determination 25 depending on the NOx-concentration % NOx_vK upstream before the SCR-catalyzer 15, the temperature te_Kat of the SCR-catalyzer 15 as well as the reagent filling level nominal value FSt_Sol. Details with regard to this can be taken from the state of the art that has been mentioned in the beginning in particular according to DE 10 2005 042 488 A1, to which it is directly referred to. In the present case it is assumed that it has to be regulated to a reagent filling level nominal value FSt_Sol, which allows a clearance upwards and downwards. The contexts are further shown in FIG. 2.

Figure 2:
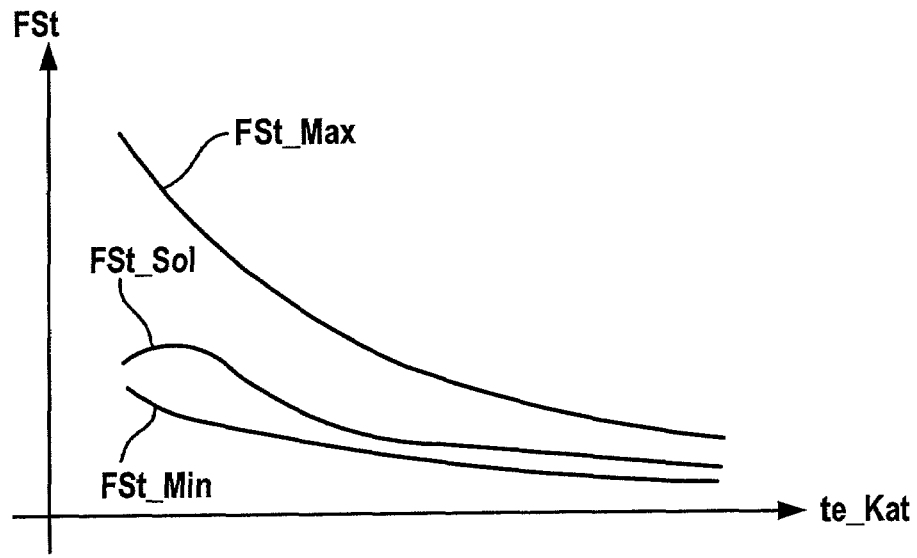
FIG. 2 shows reagent filling levels in a SCR-catalyzer depending on the temperature of the SCR-catalyzer.

FIG. 2 shows the reagent filling level FSt depending on the temperature te_Kat of the SCR-catalyzer 15. Registered are a maximum reagent filling level FSt_Max and a minimum filling level FSt_Min. At a low temperature te_Kat the SCR-catalyzer 15 can store a comparatively high amount of reagent, while the storage capability sinks at high temperature te_Kat. In FIG. 2 furthermore registered is the reagent filling level nominal value FST-Sol, which is located between the maximum reagent filling level FSt_Max and the minimum reagent filling level FSt_Min. the reagent filling level nominal value FSt_Sol provides a maximum, above which the reagent filling level nominal value FSt_Sol also sinks due to the sinking reagent storage capability of the SCR-catalyzer 15. Below the maximum the reagent filling level nominal value FSt_Sol shall be also sinking with regard to the conversion ability of the SCR-catalyzer 15 that is sinking with the continuously falling temperature te_Kat.

The metering rate determination 25 can determine the metering rate % Rea in the range of a regulation of the reagent filling level FSt in the SCR-catalyzer 15 to the reagent filling level nominal value FSt_Sol. The metering rate determination 25 can determine the metering rate % Rea alternatively also on the basis of the SCR-catalyzer efficiency.

The metering rate % Rea is converted in the metering signal determination 26 in a corresponding reagent metering signal s_Rea, which controls a component of the reagent metering 14 in such a way that the default metering is achieved.

Figure 3:
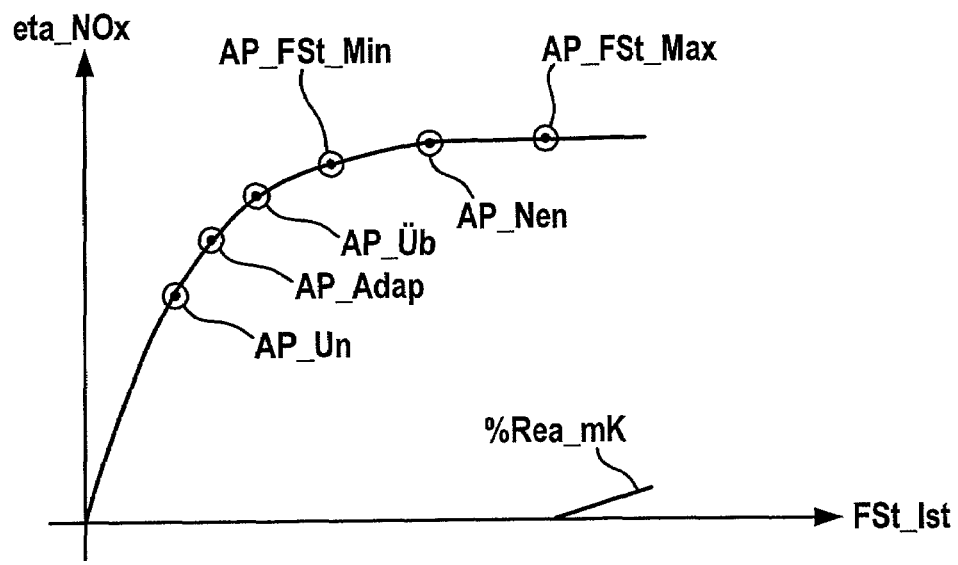
FIG. 3 shows operating points of the procedure according to the invention depending on the reagent filling level in a SCR-catalyzer.

FIG. 3 shows the efficiency eta_NOx of the SCR-catalyzer 15 depending on the reagent filling level actual value FSt_Ist. Registered is a nominal operating point AP_Nen, which is present when the reagent filling level nominal value FSt_Sol is determined according to the amount that is shown in FIG. 2. Because the reagent filling level FSt cannot be accessed by a measurement without further ado, a principal uncertainty exists about the position of the nominal operating point AP_Nen. The reagent filling level actual value FSt_Ist could for example correspond with the maximum reagent filling level FSt_Max, whereby the actual operating point would lie in this case at an operating point at a maximum reagent filling level AP_FSt_Max. As long as the operating point lies at the operating point at a maximum reagent filling level AP_FSt_Max a reagent slip % Rea_nK has already be assumed.

Accordingly the reagent filling level actual value FSt_Ist could be equivalent to the minimum reagent filing level FSt_Min. whereby in that case the actual operating point would lie at an operating point at a minimum reagent filling level AP_FSt_Min.

A diagnosis or a reasonability check of an adaptation in accordance with the way of proceeding according to the invention provides first the determination of the difference between the calculated NOx-concentration % NOx_nK_Sim downstream after the SCR-catalyzer 15 and the measured NOx-concentration % NOx_nK downstream after the SCR-catalyzer 15.

The calculated NOx-concentration % NOx-nK_Sim is calculated in the second NOx-concentration calculation 23 depending on the NOx-concentration % NOx_nK upstream before the SCR-catalyzer 15, the temperature te_Kat of the SCR-catalyzer 15 and the reagent filling level nominal value FSt_Sol according to the state of the art that has been mentioned at the beginning. The NOx-concentration % NOx_vK upstream before the SCR-catalyzer 15 can hereby be determined by the first NOx-concentration determination 25 depending on for example the intake air signal ms_L, the engine speed n and the fuel signal mK. Alternatively or additionally the NOx-concentration % NOx_vK can be measured in the exhaust duct 13 upstream before the SCR-catalyzer 15 by a not further shown NOx-sensor.

The difference between the measured NOx-concentration and the calculated NOx-concentration % NOx_nK_Sim downstream after the SCR-catalyzer 15 are determined in the adaptation control 24 and the determined difference is compared to the difference threshold value % NOx_dSW1. When exceeding the difference threshold value % NOx_dSW1 the adaptation shall be carried out. Besides also further criteria can be considered. The adaptation control 24 provides therefore the switching signal s_Adap.

According to the invention it id proceeded in such a way that a sinking of the metering rate % Rea onto a sinking metering rate % Rea_Adap is undertaken. The metering rate % Rea is shown in FIG. 4, in which the reagent filling level actual value FSt_Ist in the SCR-catalyzer 15 is registered besides the metering rate % Rea. The sinking metering rate % Rea_Adap occurs between the point of time 1 and point of time 11. The sinking shall begin at the point of time 1. Significant is hereby that the sinking metering rate % Rea_Adap is determined to a value higher than zero. Thereby it is avoided in the case of a present under-metering that the NOx-conversion can sink down to too low values, so that also during the adaptation a NOx-conversion can always be ensured.

The exceeding of the difference threshold value % NOx_dSW1 is illustrated in FIG. 5, whereby at the point of time 1 an exceeding of the difference threshold value % NOx_dSW1 shall occur between the calculated NOx-concentration % NOx_nK_Sim and the measured NOx-concentration % NOx_nK. The operating point changes during the adaptation from the nominal operating point AP_Nen to the adaptation operating point AP_Adap, which is registered in FIG. 3. If the adaptation operating point AP_Adap is achieved, the sinking metering rate % Rea_Adap is slowly increased according to FIG. 4. But simultaneously the reagent filling level actual value FSt_Ist in the SCR-catalyzer 15 sinks according to FIG. 4 due to the sinking metering rate % Rea_Adap.

In the shown embodiment it is assumed according to FIG. 5 that the measured NOx-concentration % NOx_nK downstream after the SCR-catalyzer 15 increases until the point of time 4 without regard whether an over-metering or under-metering occurred. If an under-metering occurred before the adaptation the efficiency eta_NOx of the SCR-catalyzer 15 impairs, so that the measured NOx-concentration % NOx_nK, which is in that case equivalent to a measured NOx-concentration % NOx_Ist_Un during a running adaptation at a beginning under-metering, increases after the point of time 4. The difference between the calculated NOx-concentration % NOx_nK_Sim downstream after the SCR-catalyzer 15 and the measured NOx-concentration % NOx_nK_Un during the adaptation at a beginning under-metering increases because the second NOx-concentration calculation 23 proceeds from a higher reagent filling level actual value FSt_Ist, at which a higher efficiency eta_NOx occurs.

If on the other hand an over-metering occurred before the adaptation the efficiency eta_NOx of the SCR-catalyzer 15 sinks significantly less during the adaptation. According to FIG. 5 it is assumed that the usually too high reagent filling level actual value FSt_Ist reduces up to the point of time 4 during the sinking metering rate % Rea_Adap and the still present NOx-concentration % NOx_nK upstream before the SCR-catalyzer 15. After the point of time 4 the efficiency eta_NOx of the SCR-catalyzer 15 impairs not further and merges into the measured NOx-concentration % NOx_Ist_Ub during running adaptation at a beginning over-metering, whereby according to FIG. 5 it is even assumed that the efficiency eta_NOx increases, so that the measured NOx-concentration % NOx_nK_Ub during the adaptation at a beginning over-metering sinks. Because the reagent filling level actual value FSt_Ist lies at a beginning over-metering over the reagent filling level FSt that has been assumed in the second NOx-concentration calculation 23 the second NOx-concentration calculation 23 will calculate the calculated NOx-concentration % NOx_nK_Sim increasingly higher than the measured NOx-concentration % NOx_Ist_Ub during the running adaptation at a previous over-metering actually is.

after the default of the sinking metering rate % Rea_Adap a comparison of the calculated NOx-concentration % NOx_nK_Sim downstream after the SCR-catalyzer 15 and the measured NOx-concentration % NOx_nK is carried out. If the measured NOx-concentration % NOx_nK downstream after the SCR-catalyzer 15 exceeds the calculated NOx-concentration % NOx_nK_Sim downstream after the SCR-catalyzer 15 the metering rate % Rea is increased subsequently within the range of the adaptation due to the previous under-metering. But if the measured NOx-concentration % NOx_nK lies below the calculated NOx-concentration % NOx_nK_Sim the metering rate % Rea is lowered due to the previous over-metering in the range of the adaptation, so that as a result the nominal operating point AP_Nen that has been registered in FIG. 3 lies after the adaptation at least approximately in the middle between the operating point AP_FSt_Min at a minimum reagent filling level FSt_Min and the operating point AP_FSt_Max at a maximum reagent filling level FSt_Max.

in order to be able to carry out a reliable evaluation of the signals after the sinking of the metering rate % Rea onto the sinking metering rate % Rea_Adap the default waiting time ti_W is provided in the adaptation control 24, which causes the adaptation control 24 to determine the difference between the calculated and the measured NOx-concentration % NOx_nK_Sim, % NOx_nK not until after the lapse of the waiting time ti_W. As an alternative to the waiting time ti_W it can also be provided to integrate the NOx raw emission of the combustion engine 10 and to compare the integral with a threshold value.

According to an embodiment it can be provided that at a comparison of the calculated with the measured NOx-concentration % NOx_nK_Sim, % NOx_nK the difference increasing threshold value % NOx_dSW2 is provided, whereby the metering rate % Rea is subsequently increased, if the difference between the measured and the calculated NOx-concentration % NOx_nK, % NOx_nK_Sim has exceeded the difference increasing threshold value % NOx_dSW2.

Accordingly it can be provided that at a comparison of the calculated with the measured NOx-concentration % NOx_nK_Sim, % NOx_nK the difference lowering threshold value % NOx_dSW3 is provided, whereby the metering rate % Rea is subsequently lowered, if the difference between the calculated NOx-concentration % NOx_nK_Sim and the measured NOx-concentration % NOx_nK exceeds the difference lowering threshold value % NOx_dSW3.

When comparing the calculated with the measured NOx-concentration % NOx_nK_Sim, % NOx_nK the algebraic sign of the difference has to be considered because in that case that the measured NOx-concentration % NOx_nK_Un lies during the running adaptation at a previous under-metering above the calculated NOx-concentration % NOx_nK_Sim and in the case that the measured NOx-concentration % NOx_nK_Ub lies during a running adaptation at a previous over-metering at least after the lapse of the waiting time ti_W below the calculated NOx-concentration % NOx_nK_Sim.

According to an embodiment it can be provided that the difference increasing threshold value % NOx_dSW2 and the difference lowering threshold value % NOx_dSW3 deviate from each other. But the amounts can also be equivalent. Different amounts are registered in FIG. 5.

According to an advantageous improvement it can be provided that the difference threshold value % NOx_dSW1 and/or the difference increasing threshold value % NOx_dSW2 and/or the difference lowering threshold value % NOx_dSW3 depend on the temperature te_Kat of the SCR-catalyzer 15. The temperature te_Kat could principally be measured by a temperature sensor. But preferably the temperature te_Kat is calculated with the aid of a not further shown temperature model. The consideration of the temperature te_Kat of the SCR-catalyzer 15 enables the consideration of the dependency of the reagent filling level FSt in the SCR-catalyzer 15 according to FIG. 2.

A further advantageous embodiment provides that the difference threshold value % NOx_dSW1 and/or the difference increasing threshold value % NOx_dSW2 and/or the difference lowering threshold value % NOx_dSW3 depend on the ageing or the operating time ti_B of the SCR-catalyzer 15. The operating time ti_B can be counted in a not further shown operating time determination. With this measure the lowering of the catalyzer efficiency eta_NOx can be considered with an increasing operating time ti_B.

According to another advantageous embodiment it is provided that the procedure according to the invention is only implemented if the NOx-concentration % NOx_vK upstream before the SCR-catalyzer 15 is at least approximately constant. Preferably a tolerance band % NOx_vK_Tol can be preset, within which the NOx-concentration % NOx_vK shall be located upstream before the SCR-catalyzer 15.

Another advantageous embodiment of the procedure according to the invention provides that the comparisons of the calculated and the measured NOx-concentration % NOx_nK_Sim, % NOx_nK are based on average values of the calculated and the measured NOx-concentration % NOx_nK_Sim, % NOx_nK. The average values can for example be determined by an integration over default time intervals. Thereby the adaptation is even comparatively robust at dynamic processes of the combustion engine 10 during a running adaptation.

After an adaptation it is gone back to the normal metering operation. It can hereby be provided that the reagent filling level actual value FSt_Ist is based as a new starting value for the calculation of the reagent filling level actual value FSt_Ist in the second NOx-concentration calculation 23 as well as in the metering rate determination 25. If neither the difference increasing threshold value % NOx_dSW2 nor the difference lowering threshold value % NOx_dSW3 are exceeded during the adaptation no useful result of the adaptation is present and it is assumed that a concrete metering was already present before the adaptation. In that case the reagent filling level actual value FSt_Ist in the SCR-catalyzer 15 can be set back to the reagent filling level nominal value FSt_Sol without further changes by adjusting the metering rate % Rea. In FIG. 4 for example an increased metering rate % Rea is provided at the point of time 13, in order to quickly remove the undermetering at the lowering metering rate % Rea_Adap.

The invention claimed is:

1. A method of metering a reagent into an exhaust duct of a combustion engine, wherein the reagent is required for a catalytic conversion of NOx in a SCR-catalyzer, the method comprising:
    calculating a difference between a calculated and a measured average NOx-concentration each downstream after the SCR-catalyzer;
    comparing the difference to a difference threshold; and
    lowering a metering rate to a sinking metering rate upon the difference exceeding the difference threshold, wherein the sinking metering rate is greater than zero, and wherein NOx raw emissions are integrated and a resulting integral is compared to a threshold value, wherein when the resulting integral exceeds the threshold value, the method proceeds as follows:
        comparing the calculated and the measured NO-x concentrations based on average values of the calculated NO-x concentrations and the measured NO-x concentrations generated by an integration process, wherein when the average value of the measured NOx-concentration exceeds the average value of the calculated NOx-concentration, the metering rate is increased, and when the average value of the measured NOx-concentration lies below the average value of the calculated NOx-concentration, the metering rate is decreased.

2. The method of claim 1, further comprising, upon comparing the calculated and the measured NOx-concentration; increasing the metering rate when the difference between the measured and the calculated NOx-concentration exceeds a difference-increasing threshold value.

3. The method of claim 1, further comprising, upon comparing the calculated and the measured NOx-concentration; reducing the metering rate when the difference between the measured and the calculated NOx-concentration exceeds a difference-lowering threshold value.

4. The method of claim 1, wherein a difference threshold value or a difference-increasing threshold value or a difference-lowering threshold value depends on an operating duration of the SCR-catalyzer.

5. The method of claim 1, wherein a difference threshold value or a difference-increasing threshold value or a difference-lowering threshold value depends on a temperature of the SCR-catalyzer.

6. The method of claim 1, further comprising only implementing the method when a NOx-concentration upstream before the SCR-catalyzer lies within a tolerance band.

7. A device, comprising:
    control unit, constructed and configured to:
    meter a reagent into an exhaust duct of a combustion engine, wherein the reagent is required for a catalytic conversion of NOx in a SCR-catalyzer,
    calculate a difference between a calculated and a measured NOx-concentration each downstream after the SCR-catalyzer;
    compare the difference to a difference threshold; and
    lower a metering rate to a sinking metering rate upon the difference exceeding the difference threshold, wherein the sinking metering rate is greater than zero, and wherein NOx raw emissions are integrated and a resulting integral is compared to a threshold value, wherein when the resulting integral exceeds the threshold value, the control unit;
    compare the calculated and the measured NO-x concentrations based on average values of the calculated and the measured NO-x concentrations generated by an integration process, wherein when the average value of the measured NOx-concentration exceeds the average value of the calculated NOx-concentration the metering rate is increased, and when the average value of the measured NOx-concentration lies below the average value of the calculated NOx-concentration, the metering rate is decreased;
    perform a metering rate determination;
    perform at least one NOx-concentration-calculation; and
    implement an adaptation control.

8. A computer-implemented method for metering a reagent into an exhaust duct of a combustion engine, wherein the reagent is required for a catalytic conversion of NOx in a SCR-catalyzer, the computer-implemented method comprising:
    calculating a difference between a calculated and a measured NOx-concentration each downstream after the SCR-catalyzer;
    comparing the difference to a difference threshold; and
    lowering a metering rate to a sinking metering rate upon the difference exceeding the difference threshold, wherein the sinking metering rate is greater than zero, and wherein NOx raw emissions are integrated and a resulting integral is compared to a threshold value, wherein when the resulting integral exceeds the threshold value, the method proceeds as follows:
        comparing the calculated and the measured NO-x concentrations based on average values of the calculated NO-x concentrations and the measured NO-x concentrations generated by an integration process, wherein when the average value of the measured NOx-concentration exceeds the average value of the calculated NOx-concentration, the metering rate is increased, and when the average value of the measured NOx-concentration lies below the average value of the calculated NOx-concentration, the metering rate is decreased.

9. A non-transitory machine-readable device including a stored computer program product with a program code and executed on a control unit for metering a reagent into an exhaust duct of a combustion engine, wherein the reagent is required for a catalytic conversion of NOx in a SCR-catalyzer, the program code including instructions for:
  calculating a difference between a calculated and a measured NOx-concentration each downstream after the SCR-catalyzer;
  comparing the difference to a difference threshold; and
  lowering a metering rate to a sinking metering rate upon the difference exceeding the difference threshold, wherein the sinking metering rate is greater than zero, and wherein NOx raw emissions are integrated and a resulting integral is compared to a threshold value, wherein when the resulting integral exceeds the threshold value, the control unit operates as follows:
  comparing the calculated and the measured NO-x concentrations based on average values of the calculated NO-x concentrations and the measured NO-x concentrations generated by an integration process, wherein when the average value of the measured NOx-concentration exceeds the average value of the calculated NOx-concentration, the metering rate is increased, and when the average value of the measured NOx-concentration lies below the average value of the calculated NOx-concentration, the metering rate is decreased when the measured NOx concentration exceeds the calculated NOx concentration and decreased.

10. A method for the adapting a metering of a reagent, which is required for the catalytic conversion of NOx in a SCR catalyzer, into an exhaust duct of a combustion engine, the method comprising:
  measuring an NOx-concentration downstream of the SCR catalyzer by a NOx sensor, wherein the NOx sensor has a cross-sensitivity with respect to the reagent, wherein a difference cannot be drawn between an overdosage, in which NOx and a reagent material slack occur, and an underdosage, in which only NOx occurs;
  averaging the measured NOx-concentration by integration, wherein the NOx-concentration downstream of the SCR catalyzer is calculated, and wherein an averaging of the calculated NOx-concentration is performed by integration;
  determining a difference between the calculated and the measured average value of the NOx-concentration;
  comparing the difference with a difference threshold value, in that in a case where the difference threshold value is exceeded, a lowering of the metering rate to a sinking metering rate is performed, the sinking metering rate being set to a value greater than zero, in that the NOx raw emissions of the combustion engine continue to be integrated and the integral is compared to a threshold value;
  wherein after the integral of the NOx raw emissions exceeds the threshold value, if the measured average value of the NOx-concentration exceeds the average value of the calculated NOx-concentration, the metering rate is increased; and if the measured average value of the NOx-concentration lies below the calculated average value of the NOx-concentration, the metering rate is decreased.

* * * * *